US012117293B2

(12) United States Patent
Ma et al.

(10) Patent No.: US 12,117,293 B2
(45) Date of Patent: Oct. 15, 2024

(54) MICROMECHANICAL GYROSCOPE AND ELECTRONIC DEVICE

(71) Applicant: AAC Kaitai Technologies (Wuhan) CO., LTD, China (CN)

(72) Inventors: Zhao Ma, Shenzhen (CN); Zhan Zhan, Shenzhen (CN); Shan Yang, Shenzhen (CN); Xiao Kan, Shenzhen (CN); Shitao Yan, Shenzhen (CN); Hongtao Peng, Shenzhen (CN); Yang Li, Shenzhen (CN); Kahkeen Lai, Singapore (SG); Veronica Tan, Singapore (SG); Yan Hong, Shenzhen (CN)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 304 days.

(21) Appl. No.: 17/879,816

(22) Filed: Aug. 3, 2022

(65) Prior Publication Data
US 2023/0266122 A1 Aug. 24, 2023

(30) Foreign Application Priority Data
Feb. 22, 2022 (CN) .......................... 202210159812.5

(51) Int. Cl.
*G01C 19/5712* (2012.01)
(52) U.S. Cl.
CPC ............................. *G01C 19/5712* (2013.01)

(58) Field of Classification Search
CPC ............ G01C 19/5712; G01C 19/5733; G01C 19/5747; B81B 3/0021; B81B 2201/0242
See application file for complete search history.

(56) References Cited

U.S. PATENT DOCUMENTS

| | | | | |
|---|---|---|---|---|
| 2010/0154543 A1* | 6/2010 | Diem | ................ | G01C 19/5747 73/504.14 |
| 2012/0055248 A1* | 3/2012 | Hammer | ............ | G01C 19/5712 73/504.12 |
| 2012/0291548 A1* | 11/2012 | Kanemoto | ......... | G01C 19/5733 73/504.12 |
| 2013/0298672 A1* | 11/2013 | Kuhlmann | ......... | G01C 19/5747 73/504.12 |

(Continued)

*Primary Examiner* — David J Bolduc
(74) *Attorney, Agent, or Firm* — W&G Law Group

(57) ABSTRACT

A micromechanical gyroscope and an electronic device are related. The micromechanical gyroscope includes a first movement member, a second movement member, many drive members and a detection member, the first movement member has a first center, with two ends along a second direction oscillating around the first center along a first and a third directions, the second movement member has a second center, with two ends along the first direction oscillating around the second center along the second and third directions. The drive members can drive oscillations of the first and second movement members. The detection member is located above or below the first and second movement members in the third direction, to detect moving distances of the first and second movement members along the third direction. The micromechanical gyroscope can detect angular velocities in two directions simultaneously and perform differential detection to reduce errors, thus expanding application scenarios.

20 Claims, 6 Drawing Sheets

(56) References Cited

U.S. PATENT DOCUMENTS

| | | | |
|---|---|---|---|
| 2014/0060184 A1* | 3/2014 | Walther | G01P 15/123 |
| | | | 73/504.03 |
| 2014/0373627 A1* | 12/2014 | Pruetz | G01C 19/5712 |
| | | | 73/504.12 |
| 2015/0128700 A1* | 5/2015 | Neul | G01C 19/5726 |
| | | | 73/504.04 |
| 2015/0330783 A1* | 11/2015 | Rocchi | G01C 19/5769 |
| | | | 73/504.12 |
| 2016/0025492 A1* | 1/2016 | Rocchi | G01C 19/5712 |
| | | | 73/504.08 |
| 2016/0370180 A1* | 12/2016 | Naumann | G01C 19/5621 |
| 2019/0101391 A1* | 4/2019 | Nagata | G01C 19/5649 |
| 2019/0310087 A1* | 10/2019 | Gregory | G01C 19/5712 |
| 2020/0200535 A1* | 6/2020 | Kuisma | G01C 19/5712 |
| 2020/0263988 A1* | 8/2020 | Blomqvist | G01C 19/5747 |
| 2021/0372794 A1* | 12/2021 | Blomqvist | G01C 19/574 |
| 2023/0213339 A1* | 7/2023 | Yang | G01C 19/5733 |
| | | | 73/504.12 |
| 2023/0228569 A1* | 7/2023 | Ma | G01C 19/5712 |
| | | | 73/504.12 |

\* cited by examiner

MICROMECHANICAL GYROSCOPE AND ELECTRONIC DEVICE

TECHNICAL FIELD

The present invention relates to a technical field of gyroscope, especially to a micromechanical gyroscope and an electronic device.

BACKGROUND

A micromechanical gyroscope is a typical angular velocity sensor, generally including a drive member, a movement member and a detection member, and has an operation principle that: the drive member can drive the movement member to reciprocate at a high frequency in a determined plane along a determined direction; when the micromechanical gyroscope rotates with angular velocity of a direction perpendicular to the above plane, the movement member is applied with Coriolis force perpendicular to the above determined direction, and a displacement of the movement member will happen; and the detection member can detect a magnitude of the displacement, so as to obtain the angular velocity of the rotation and thus a detection of the angular velocity can be realized. In order to achieve a differential detection, a current micro-mechanical gyroscope generally has two movement members with a phase difference of 180°, but the differential detection cannot be realized in all detection directions due to a limited size of the micro-mechanical gyroscope.

SUMMARY

One objective of the present invention is to provide a micromechanical gyroscope and an electronic device, and the micromechanical gyroscope is capable of measuring angular velocities in two directions simultaneously.

The present application provides a micromechanical gyroscope, including: a first movement member, a second movement member, a plurality of drive members and a detection member, the first movement member having a first center and two ends of the first movement member along a second direction oscillating around the first center along a first direction and a third direction, the second movement member having a second center and two opposite ends of the second movement member along the first direction oscillating around the second center along the second direction and in the third direction, the plurality of drive members driving the first movement member to oscillate along the first direction and the second movement member to oscillate along the second direction, the detection member being located above or below the first movement member and the second movement member along the third direction, the detection member configured to detect a distance the first movement member and of the second movement member moving along the third direction, wherein the first direction is perpendicular to and coplanar with the second direction, and the third direction is perpendicular to the first direction and the second direction.

According to one embodiment of the present invention, the first movement member is provided in a plurality along the first direction, and the second movement member is provided in a plurality along the second direction.

According to one embodiment of the present invention, the micromechanical gyroscope further includes a first anchor point, a first coupling member, a first connection member and a second connection member, the first anchor point being disposed on two sides of the first movement member along the first direction and the first anchor point being disposed on two sides of the second movement member along the second direction, the first coupling member being coupled to the first anchor point, the first coupling member being rotatable around the first anchor point. The first connection member connects the first coupling member with the drive member. The second connection member connects the first coupling member with the first movement member, and further connects the first coupling member with the second movement member. The drive member drives the first coupling member to rotate around the first anchor point through the first connection member, and the first coupling member drives the first movement member and the second movement member to oscillate through the second connection member.

According to one embodiment of the present invention, the micromechanical gyroscope further includes a second anchor point, a third anchor point, a third connection member and a fourth connection member. The second anchor point is disposed on two sides of the first center along the first direction or at the first center, the third anchor point is disposed on two sides of the second center along the second direction or at the second center, the third connection member connects the second anchor point with the first the with the first movement member, and the fourth connection member connects the third anchor point with the second movement member.

According to one embodiment of the present invention, the micromechanical gyroscope further includes a second coupling member and a fifth connection member. The second coupling member is disposed at a center of the micromechanical gyroscope, and the fifth connection member connects the drive member with the second coupling member.

According to one embodiment of the present invention, the second coupling member is circular or elongated.

According to one embodiment of the present invention, the micromechanical gyroscope further includes a fourth anchor point and a sixth connection member, the fourth anchor point being disposed at the center of the micromechanical gyroscope, and the sixth connection member connecting the drive member with the fourth anchor point.

According to one embodiment of the present invention, the drive members the drive members (3) are configured parallelly with a number of two, which move in opposite directions along the first direction or the second direction.

According to one embodiment of the present invention, a plurality of the drive members are distributed along a circumference of the micromechanical gyroscope, and the plurality of the drive members all reciprocate along a tangential direction of the circumference, or all reciprocate in a radial direction of the circumference.

The present application further provides an electronic device, the electronic device including a main body and a micromechanical gyroscope, the micromechanical gyroscope being mounted on the body, and the micromechanical gyroscope is the micromechanical gyroscope described above.

The beneficial effect of the embodiments may include that the micromechanical gyroscope involves three operation modes, i.e., a driving mode, a first detection mode and a second detection mode. In the driving mode, the drive member drives the first movement member to oscillate along the first direction and the second movement member to oscillate along the second direction. Since the oscillation of the first movement member is around the first center and the oscillation of the second movement member is around the second center, the driving effect that the drive members drive the first movement member and the second movement member in this disclosure is better and smoother, compared with the case that the drive member drives the movement member to only reciprocate in a single direction in the related art. When the micromechanical gyroscope rotates with an angular velocity of the first direction according to an external environment, as the first movement member oscillates along the first direction, the first movement member is applied with Coriolis force along the third direction and oscillates along the third direction, in which case, the micromechanical gyroscope is in the first detection mode, and the detection member can detect the distance the first movement member moves along the third direction, so as to achieve the angular velocity that the micromechanical gyroscope rotating around the first direction with. When the micromechanical gyroscope rotates with an angular velocity of the second direction according to the external environment, as the second movement member oscillates along the second direction, the second movement member is applied with Coriolis force in the third direction and oscillates along the third direction, in which case, the micromechanical gyroscope is in the second detection mode, and the detection member can detect the distance the second movement member moves along the third direction, so as to achieve the angular velocity that the micromechanical gyroscope rotating about the second direction with. As the first detection mode and the second detection mode may exist simultaneously and independently with no interference with each other, the micromechanical gyroscope can detect the angular velocities in two directions simultaneously, thus expanding application scenarios of the micromechanical gyroscope. In addition, the first movement member may be divided into a first part and a second part symmetrically according to the first center, and the second movement member may be divided into a third part and a fourth part symmetrically according to the second center. Since a motion of the first part and a motion of the second part generated under driving of the drive member along the third direction are reciprocating motions with a same frequency and opposite directions, while the motion of the first part and the motion of the second part driven by an exterior impact share the same direction, common-mode outputting of displacement signals of the first part and the second part detected by the detection member and the operation of differential detection can be adopted to retrain detection errors caused by the exterior impact, then to be effectively immune to acceleration shocks and quadrature errors and realize amplification of the signals, thus improving detection sensitivity of the micromechanical gyroscope. The operation principles of the third part and fourth part are the same as those of the first part and second part. The detection member is located above or below the first part, the second part, the third part and the fourth part along the third direction, and the detection member has a large detection area, thus effectively improving the electromechanical coupling coefficient in detection of the micromechanical gyroscope, and thus improving the detection sensitivity and signal-to-noise ratio of the micromechanical gyroscope.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative efforts.

Figure 1:
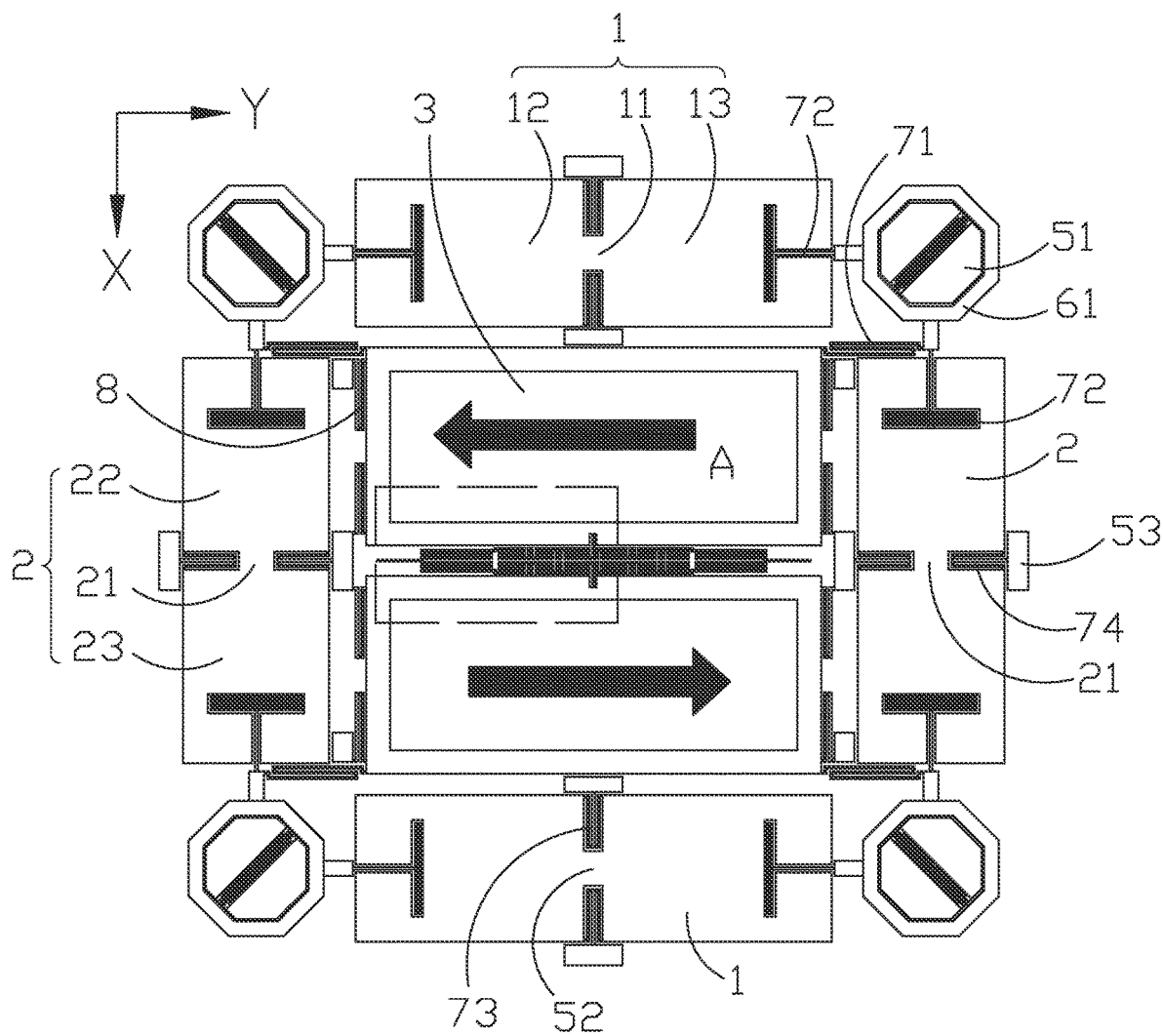
FIG. 1 is a schematic diagram of a structure of the micromechanical gyroscope provided in a first specific embodiment.

The reference signs described in the embodiments are listed below.
X denotes a first direction.
Y denotes a second direction.
Z denotes a third direction.
1 denotes a first movement member.
11 denotes a first center.
12 denotes a first part.
13 denotes a second part.
2 denotes a second movement member.
21 denotes a second center.
22 denotes a third part.
23 denotes a fourth part.
3 denotes a drive member.
4 denotes a detection member.
51 denotes a first anchor point.
52 denotes a second anchor point.
53 denotes a third anchor point.
54 denotes a fourth anchor point.
61 denotes a first coupling member.
62 denotes a second coupling member.
71 denotes a first connection member.
72 denotes a second connection member.
73 denotes a third connection member.
74 denotes a fourth connection member.
75 denotes a fifth connection member.
8 denotes a guide member.

The accompanying drawings herein are incorporated into the specification and constitute part of this specification, and are further used to interpret the principles of the present application together with the specification.

DETAILED DESCRIPTION OF EMBODIMENTS

In order to make technical solutions of the present application more understandable, embodiments of the present disclosure are described in detail with reference to accompanying drawings in the following.

It should be noted that, the described following embodiments are merely a part of the embodiments of the present invention, rather than all of the embodiments. For one of ordinary skills in the art, any other embodiments obtained on the basis of the embodiments in the present disclosure without paying creative efforts, shall all fall into the protection scope of the present invention.

The terms used in the embodiments of the present disclosure are merely for purposes of describing a specific embodiment, rather than limiting the present disclosure. The terms "a", "an", "the" and "said" in a singular form in an embodiment of the present disclosure and the attached claims are also intended to include plural forms thereof, unless noted otherwise.

It should be understood that the term "and/or" used in the disclosure is merely to describe a correlation relation of related objects, indicating that there can be three relations, e.g., A and/or B can indicate only A, both A and B, and only B. In addition, the character "/" in the context generally indicates that the relation between the objects in front and at the back of "/" is an "or" relationship.

It should be noted that the terms representing directions such as "up", "down", "left" and "right" described in the embodiments of the present application are described from the angles shown in the accompanying drawings, and should not be understood as a limitation on the embodiments of the present application. In addition, in the context, it should also be understood that when it is mentioned that an element is connected "on" or "under" another element, it can not only be directly connected "on" or "under" another element, but also be indirectly connected "on" or "under" another element through an intermediate element.

In an embodiment of the present application, an electronic device is provided, the electronic device including a main body and a micromechanical gyroscope, and the micromechanical gyroscope can be mounted on the body.

In the present implementation, the micromechanical gyroscope is capable of detecting an angular velocity of the electronic device, to facilitate to assist the work of the electronic device. Meanwhile, it is possible that the micromechanical gyroscope can detect the angular velocities in two directions simultaneously, thus improving performances of the electronic device.

Figure 3:
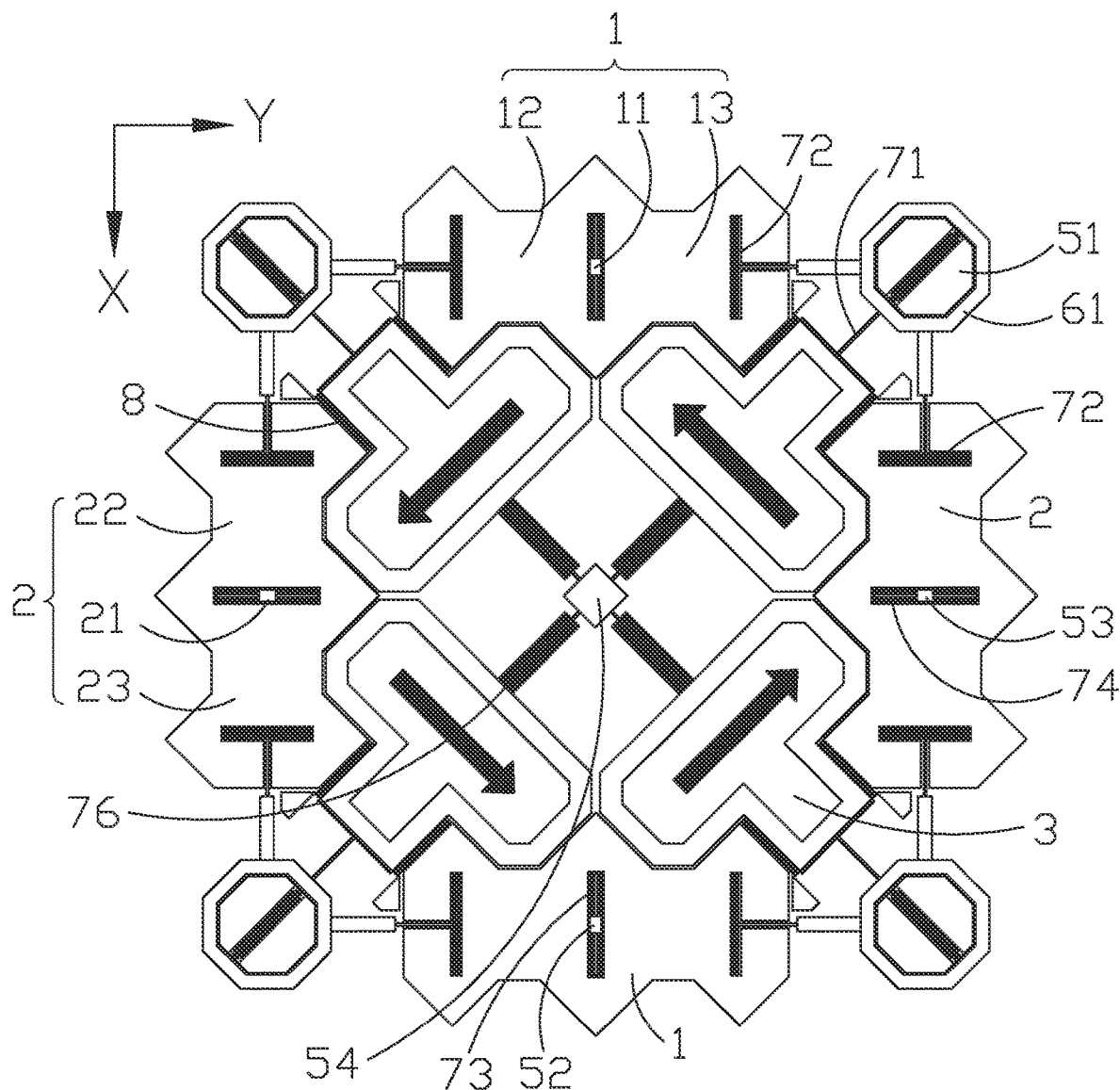
FIG. 3 is a schematic diagram of a structure of the micromechanical gyroscope provided in a second specific embodiment.
Figure 4:
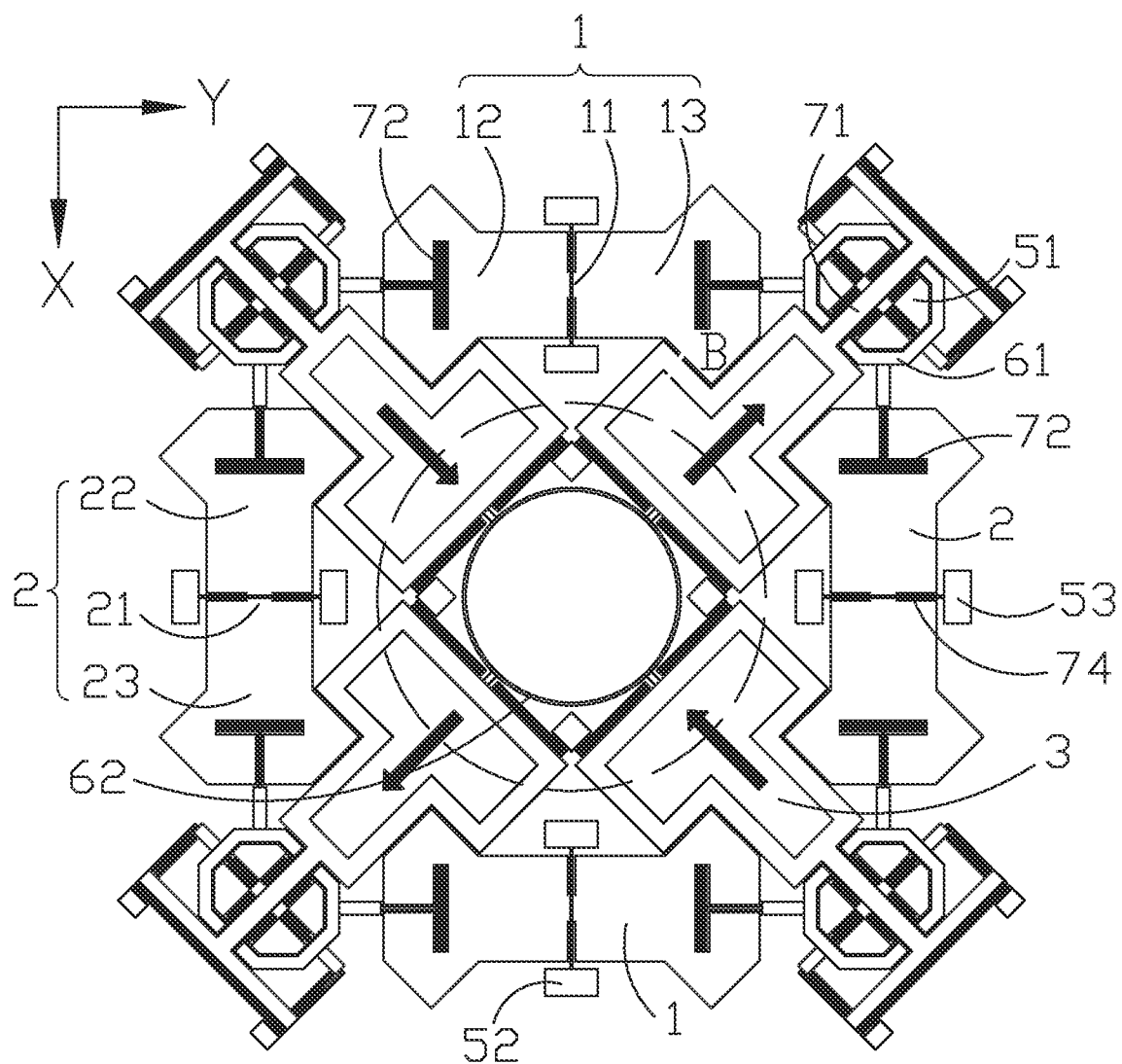
FIG. 4 is a schematic diagram of a structure of the micromechanical gyroscope in a third specific embodiment.

Embodiments of the present disclosure provide a micromechanical gyroscope, as shown in FIGS. 1, 3 and 4, the micromechanical gyroscope includes a first movement member 1, a second movement member 2, a plurality of drive members 3 and a detection member 4. The first movement member 1 has a first center 11, and two ends of the first movement member 1 along a second direction Y are able to oscillate around the first center 11 along a first direction X and a third direction Z. The second movement member 2 has a second center 21, and two ends of the second movement member 2 along the first direction X can oscillate around the second center 21 along the second direction Y and the third direction Z. The plurality of drive members 3 can drive the oscillation of the first movement member 1 along the first direction X and the oscillation of the second movement member 2 along the second direction Y. The detection member 4 is located above or below the first movement member 1 and the second movement member 2 along the third direction Z. The detection member 4 is configured to detect distances that the first movement member 1 and the second movement member 2 move along the second direction Z. Herein, the first direction X is perpendicular to and coplanar with the second direction Y, and the third direction Z is perpendicular to the first direction X and the second direction Y.

In the present implementation, as shown in FIGS. 1, 3 and 4, the micromechanical gyroscope involves three operation modes, i.e., a drive mode, a first detection mode and a second detection mode. In the drive mode, the drive member 3 drives the first movement member 1 to oscillate along the first direction X and the second movement member 2 to oscillate along the second direction Y. Since the oscillation of the first movement member 1 is around the first center 11 and the oscillation of the second movement member 2 is around the second center 21, the driving effect that the drive member 3 drives the first movement member 1 and the second movement member 2 in this disclosure is better and smoother, compared with the case that the drive member drives the movement member to merely reciprocate in a single direction in the related art.

When the micromechanical gyroscope rotates with an angular velocity of the first direction X according to an external environment, as the first movement member 1 oscillates along the first direction X, the first movement member 1 is applied with Coriolis force in the third direction Z and oscillates along the third direction Z. In this case, the micromechanical gyroscope is in the first detection mode, and the detection member 4 can detect the distance that the first movement member 1 moves along the third direction Z, so as to achieve the angular velocity that the micromechanical gyroscope rotating around the first direction X with. When the micromechanical gyroscope rotates with an angular velocity of the second direction Y according to the external environment, as the second movement member 2 oscillates along the second direction Y, the second movement member 2 is applied with Coriolis force along the third direction Z and oscillates along the third direction Z. In this case, the micromechanical gyroscope is in the second detection mode, and the detection member 4 can detect the distance the second movement member 2 moves along the third direction Z, so as to achieve the angular velocity that the micromechanical gyroscope rotating around the second direction Y with. As the first detection mode and the second detection mode can exist simultaneously and independently with no interference with each other, the micromechanical gyroscope can detect the angular velocities in two directions simultaneously, thus expanding the application scenarios of the micromechanical gyroscope. Herein, the detection member 4 can be a detection electrode, and the drive member 3 can be provided with a drive electrode inside. The first movement member 1 and the second movement member 2 can be rectangular, specifically, the first movement member 1 has a length direction parallel to the second direction Y, and the second movement member 2 has a length direction parallel to the first direction X.

In addition, the first movement member 1 is divided into a first part 12 and a second part 13 symmetrically according to the first center 11, and the second movement member 2 is divided into a third part 22 and a fourth part 23 symmetrically according to the second center 21. Since a motion of the first part 12 and a motion of the second part 13 generated under driving of the drive member 3 along the third direction Z are reciprocating motions with a same frequency and opposite directions, while the motion of the first part 12 and the motion of the second part 13 driven by an exterior impact share the same direction, common-mode outputting of displacement signals of the first part 12 and the second part 13 detected by the detection member 4 and operation of differential detection can be adopted to retrain detection errors caused by the exterior impact, then to be effectively immune to acceleration shocks and orthogonal errors and realize amplification of the signals, thus improving detection sensitivity of the micromechanical gyroscope. Operation principles of the third part 22 and the fourth part 23 are the same as that of the first part 12 and the second part 13.

Figure 6:
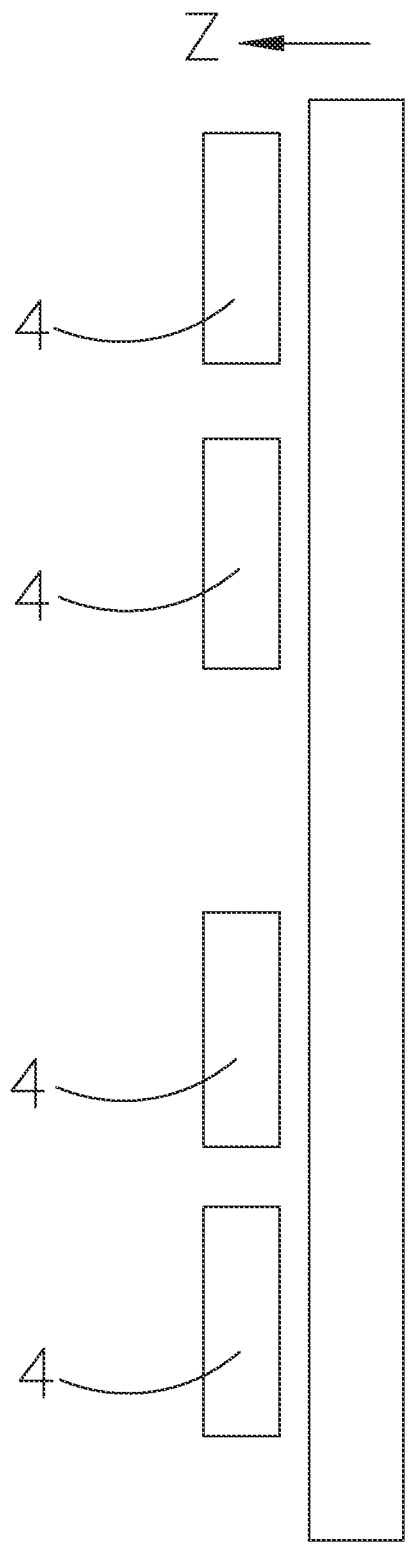
FIG. 6 Illustrates a side view of the micromechanical gyroscope provided in the present invention.

As shown in FIG. 6, the detection member 4 is located above or below the first part 21, the second part 22, the third part 22 and the fourth part 23 along the third direction Z, and the detection member 4 has a large detection area, thus effectively improving the electromechanical coupling coefficient in detection of the micromechanical gyroscope, and thus improving the detection sensitivity and signal-to-noise ratio of the micromechanical gyroscope.

In a specific implementation, as shown in FIGS. 1, 3 and 4, a plurality of first movement members 1 are disposed along the first direction X and a plurality of second movement members 2 are disposed along a second direction Y.

In the present implementation, since the first movement members 1 and the second movement members 2 may be both provided in a plurality, the micromechanical gyroscope can detect a plurality of angular velocities by a plurality of first movement members 1 in the first detection mode and multiple angular velocities by a plurality of second movement members 2 in the second detection mode. By analyzing and processing the angular velocities, the detection error can be reduced, to make values detected by the micromechanical gyroscope more accurate. In the present embodiment, the number of the first movement member 1 provided in the first direction X is two, and the number of the second movement member 2 provided in the second direction Y is two.

In a specific implementation, as shown in FIGS. 1, 3 and 4, the micromechanical gyroscope further includes a first anchor point 51, a first coupling member 61, a first connection member 71, and a second connection member 72. The first anchor point 51 is disposed on two sides of the first movement member 1 along the first direction X and the first anchor point 51 is also disposed on two sides of the second movement member 2 along the second direction Y. The first coupling member 61 is coupled to the first anchor point 51 and is rotatable around the first anchor point 51, the first connection member 71 connects the first coupling member 61 with the drive member 3, the second connection member 72 connects the first coupling member 61 with the first movement member 1, and also connects the first coupling member 61 with the second movement member 2. Herein the drive member 3 drives the first coupling member 61 to rotate around the first anchor point 51 through the first connection member 71. Through the second coupling member 72, the first coupling member 61 drives the first movement member 1 and the second movement member 2 to oscillate.

In this implementation, as shown in FIGS. 1, 3 and 4, the number of first coupling member 61 provided along the circumference of the drive member 3 is four, and the drive member 3 is connected to the first coupling member 61 through the first connection member 71, and the motion of the drive member 3 drives the four first coupling members 61 to rotate around the first anchor point 51 in a clockwise direction or a counterclockwise direction. Since the first coupling member 61 is connected to the first movement member 1 and the second movement member 2 through the second connection member 72, the first coupling member 61 can drive the oscillation of the first movement member 1 and the second movement member 2 synchronously, helping the drive member 3 to drive the first movement member 1 and the second movement member 2, and simultaneously getting a balanced total structural moment of the micromechanical gyroscope in the three modes, so as to improve the driving stability of the micromechanical gyroscope. Meanwhile, the first coupling member 61 only restricts or drives the motion of the first movement member 1 and the second movement member 2 in a plane of the first direction X and the second direction Y, and does not restrict the motion of the first movement member 1 and the second movement member 2 along the third direction Z, thus avoiding interferences between any two of the driving mode, the first detection mode and the second detection mode, and reducing the detection error of the micromechanical gyroscope.

On the basis of the above implementations, three specific embodiments are provided in the disclosure.

Figure 2:
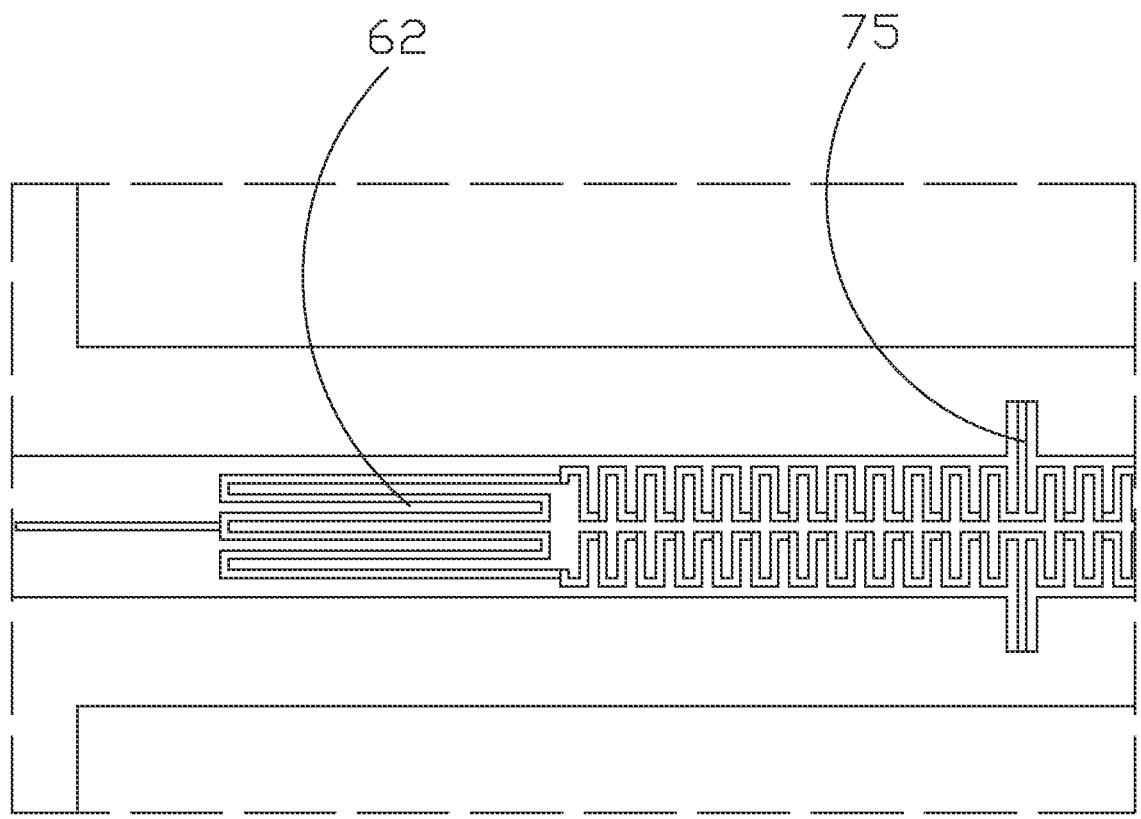
FIG. 2 illustrates a partially enlarged view of area A in FIG. 1.

In a first specific embodiment, as shown in FIGS. 1 and 2, two drive members 3 are provided parallel along the first direction X, and two drive members 3 move in opposite directions along the second direction Y. The micromechanical gyroscope also includes a second coupling member 62 and a fifth connection member 75, the second coupling member 62 is disposed at a center of the micromechanical gyroscope and is located between the two drive members 3, and the two drive members 3 are connected with the second coupling member 62 through the fifth connection member 75. Each drive member 3 is also connected to two first coupling members 61 through the first connection member 71, so that the motion of the two drive members 3 along the second direction Y drives the four first coupling members 61 to rotate around the first anchor point 51 in a clockwise direction or a counterclockwise direction, then to drive the first movement member 1 and the second movement member 2 to oscillate through cooperation of the first coupling member 61 and the second connection member 72. In addition, the second coupling member 62 is elongated to effectively utilize the space between the two drive members 3, thus reducing the size of the micromechanical gyroscope.

In the present embodiment, the micromechanical gyroscope further includes a second anchor point 52, a third anchor point 53, a third connection member 73 and a fourth connection member 74, wherein the second anchor point 52 is disposed on two sides of the first center 11 along the first direction X, the third anchor point 53 is disposed on two sides of the second center 21 along the second direction Y, the third connection member 73 connects the second anchor point 52 with the first movement member 1, and the fourth connection member 74 connects the third anchor point 53 with the second movement member 2.

As shown in FIG. 1, the second anchor point 52 is connected to the first movement member 1 through a third connection member 73, so as to enable the first movement member 1 to oscillate around the first center 11 along the third direction Z (i.e., having a degree of freedom to rotate around the first direction X) and to limit a degree of freedom of the first movement member 1 to rotate around the second direction Y, so that the first movement member 1 is insensitive to rotation with an angular velocity direction of the second direction Y. The third anchor point 53 is connected to the second movement member 2 through the fourth connection member 74, so that the second movement member 2 can oscillate around the first center 11 along the third direction Z (i.e., having a degree of freedom to rotate around the second direction Y) and limits the degree of freedom of the first movement member 1 to rotate around the first direction X, thereby making the second movement member 2 insensitive to rotation with an angular velocity direction of the first direction X. Thus, the first detection mode and the second detection mode are independent with no interferences with each other, reducing the detection error of the micromechanical gyroscope.

In a second specific embodiment, as shown in FIG. 3, four drive members 3 are disposed along a circumference of the micromechanical gyroscope, and the four drive members 3 all move along a tangential direction of the circumference in a clockwise way or all move in a tangential direction of the circumference in a counterclockwise way. The micromechanical gyroscope also includes a fourth anchor point 54 and a sixth connection member 76, the fourth anchor point 54 is disposed in the center of the micromechanical gyroscope, and the four drive members 3 are connected to the fourth anchor point 54 through the sixth connection member 76. Each drive member 3 is also connected to a first coupling member 61 through the first connection member 71, so that the motion of the four drive members 3 along the tangential direction of the circumference drives the rotation of the four first coupling members 61 around the first anchor point 51, and the motion synchronization of the drive members 3, the first movement member 1 and the second movement member 2 is ensured through the first coupling member 61 and the sixth connection member 76.

In the present embodiment, the micromechanical gyroscope further includes a second anchor point 52, a third anchor point 53, a third connection member 73 and a fourth connection member 74, wherein the second anchor point 52 is disposed at the first center 11, the third anchor point 53 is disposed at the second center 21, the third connection member 73 connects the second anchor point 52 with the first movement member 1, and the fourth connection member 74 connects the third anchor point 53 with the second movement member 2.

As shown in FIG. 3, the second anchor point 52 is connected to the first movement member 1 through a third connection member 73, so as to enable the first movement member 1 to oscillate around the first center 11 along the third direction Z (i.e., having a degree of freedom to rotate around the first direction X) and to limit a degree of freedom of the first movement member 1 to rotate around the second direction Y, so that the first movement member 1 is insensitive to rotation with an angular velocity direction of the second direction Y. The third anchor point 53 is connected to the second movement member 2 through the fourth connection member 74, so that the second movement member 2 can oscillate around the first center 11 along the third direction Z (i.e., having a degree of freedom to rotate around the second direction Y) and limits the degree of freedom of the first movement member 1 to rotate around the first direction X, thereby making the second movement member 2 insensitive to rotation with an angular velocity direction of the first direction X. Thus, the first detection mode and the second detection mode are independent with no interferences with each other, reducing the detection error of the micromechanical gyroscope.

Figure 5:
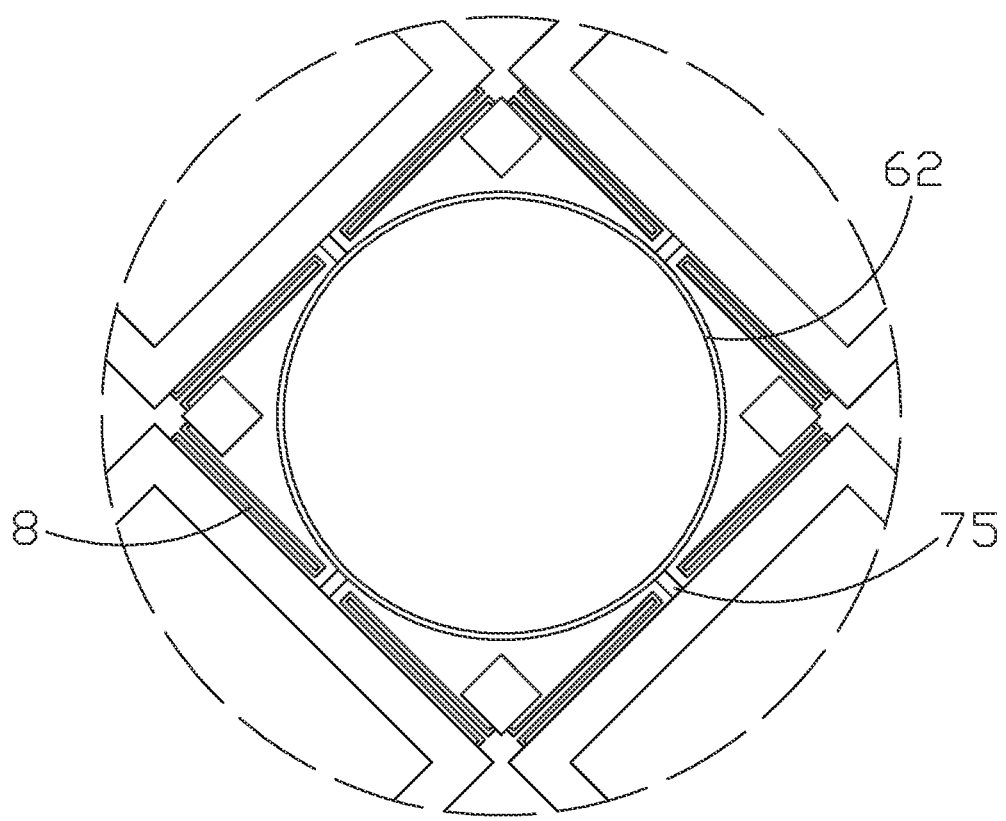
FIG. 5 illustrates a partially enlarged view of area B in FIG. 4.

In a third specific embodiment, as shown in FIGS. 4 and 5, four drive members 3 are disposed along the circumference of the micromechanical gyroscope, and the four drive members 3 all reciprocate in a radial direction of the circumference. The micromechanical gyroscope also includes a second coupling member 62 and a fifth connection member 75, the second coupling member 62 is disposed at the center of the micromechanical gyroscope, and the four drive members 3 are connected to the second coupling member 62 through the fifth connection member 75. Each drive member is also connected to one first coupling member 61 through a first connection member 71, so that the motion of the four drive members 3 in the radial direction along the circumference drives the rotation of the four first coupling members 61 around the first anchor point 51, and the motion synchronization of the drive members 3, the first movement member 1 and the second movement member 2 is ensured through the first coupling member 61 and the second coupling member 62. In addition, the second coupling member 62 is circular, and the radial direction of the circumference is configured opposite to the direction of motion of the drive member 3, so that the second coupling member 62 changes smoothly between an ellipse shape and a circle shape, thus improving the driving stability of the drive member 3. Besides, the second coupling member 62 can be in other symmetrical shapes, such as square, quadrangular or octagonal star shapes.

In the present embodiment, the micromechanical gyroscope further includes a second anchor point 52, a third anchor point 53, a third connection member 73 and a fourth connection member 74, wherein the second anchor point 52 is disposed on two sides of the first center 11 along the first direction X, the third anchor point 53 is disposed on two sides of the second center 21 along the second direction Y, the third connection member 73 connects the second anchor point 52 with the first movement member 1, and the fourth connection member 74 connects the third anchor point 53 with the second movement member 2. This structure poses effect the same as the effect of the corresponding structure in the first specific embodiment, and will not be repeated herein.

For the three specific embodiments above, the first connection member 71, the second connection member 72, the third connection member 73, the fourth connection member 74 and the fifth connection member may all be connection beams, flexible beams or elastic beams. The second connection member 72 may be a T-shaped beam.

For the above three specific embodiments, both two sides of the drive member 3 along the direction of movement can be provided with a guide member, thus making the motion of the drive member 3 smoother and more reliable.

For the above three specific embodiments, the micromechanical gyroscope can also be provided with a drive transducer and a detection transducer, so that the micromechanical gyroscope can have better driving performance and detection performance.

The foregoing descriptions are only preferred embodiments of the present disclosure. For those skilled in the art, the present disclosure can have various modifications and changes. Any modification, equivalent replacement, improvement, and the like made within the spirit and principle of this disclosure shall be included in the protection scope of the present disclosure.

What is claimed is:

1. A micromechanical gyroscope, comprising:
    a first movement member, the first movement member having a first center, with two ends of the first movement member along a second direction being able to oscillate around the first center along a first direction and a third direction;
    a second movement member, the second movement member having a second center, with two ends of the second movement member along the first direction being able to oscillate around the second center in the second direction and the third direction;
    a plurality of drive members, being able to drive the first movement member to oscillate along the first direction and the second movement member to oscillate along the second direction; and
    a detection member, the detection member being located above or below the first movement member and the second movement member along the third direction, the detection member being configured to detect a distance the first movement member and the second movement member moving along the third direction;
    wherein, the first direction is perpendicular to and coplanar with the second direction, and the third direction is perpendicular to the first direction and the second direction.

2. The micromechanical gyroscope according to claim 1, wherein, the first movement member is provided in a plurality along the first direction, and the second movement member is provided in a plurality along the second direction.

3. The micromechanical gyroscope according to claim 2, wherein, the micromechanical gyroscope further comprises:
   a first anchor point, the first anchor point being disposed on two sides of the first movement member along the first direction and the first anchor point being disposed on both sides of the second movement member along the second direction;
   a first coupling member, the first coupling member being coupled to the first anchor point, the first coupling member being rotatable around the first anchor point;
   a first connection member, the first connection member connecting the first coupling member with the drive members; and
   a second connection member, the second connection member connecting the first coupling member with the first movement member, and further connecting the first coupling member with the second movement member; wherein
   the drive members drive the first coupling member to rotate around the first anchor point through the first connection member, and the first coupling member drives the first movement member and the second movement member to oscillate through the second connection member.

4. The micromechanical gyroscope according to claim 3, wherein the micromechanical gyroscope further comprises:
   a second anchor point, the second anchor point being disposed on two sides of the first center along the first direction or disposed at the first center;
   a third anchor point, the third anchor point being disposed on two sides of the second center along the second direction or disposed at the second center;
   a third connection member, the third connection member connecting the second anchor point with the first movement member; and
   a fourth connection member, the fourth connection member connecting the third anchor point with the second movement member.

5. The micromechanical gyroscope according to claim 1, wherein the micromechanical gyroscope further comprises:
   a second coupling member, the second coupling member being disposed at a center of the micromechanical gyroscope;
   a fifth connection member, the fifth connection member connecting the drive members with the second coupling member.

6. The micromechanical gyroscope according to claim 2, wherein the micromechanical gyroscope further comprises:
   a second coupling member, the second coupling member being disposed at a center of the micromechanical gyroscope;
   a fifth connection member, the fifth connection member connecting the drive members with the second coupling member.

7. The micromechanical gyroscope according to claim 3, wherein the micromechanical gyroscope further comprises:
   a second coupling member, the second coupling member being disposed at a center of the micromechanical gyroscope;
   a fifth connection member, the fifth connection member connecting the drive members with the second coupling member.

8. The micromechanical gyroscope according to claim 4, wherein the micromechanical gyroscope further comprises:
   a second coupling member, the second coupling member being disposed at a center of the micromechanical gyroscope;
   a fifth connection member, the fifth connection member connecting the drive members with the second coupling member.

9. The micromechanical gyroscope according to claim 5, wherein the second coupling member is circular or elongated.

10. The micromechanical gyroscope according to claim 1, wherein the micromechanical gyroscope further comprises:
    a fourth anchor point, the fourth anchor point being disposed at a center of the micromechanical gyroscope; and
    a sixth connection member, the sixth connection member connecting the drive members with the fourth anchor point.

11. The micromechanical gyroscope according to claim 2, wherein the micromechanical gyroscope further comprises:
    a fourth anchor point, the fourth anchor point being disposed at a center of the micromechanical gyroscope; and
    a sixth connection member, the sixth connection member connecting the drive members with the fourth anchor point.

12. The micromechanical gyroscope according to claim 3, wherein the micromechanical gyroscope further comprises:
    a fourth anchor point, the fourth anchor point being disposed at a center of the micromechanical gyroscope; and
    a sixth connection member, the sixth connection member connecting the drive members with the fourth anchor point.

13. The micromechanical gyroscope according to claim 4, wherein the micromechanical gyroscope further comprises:
    a fourth anchor point, the fourth anchor point being disposed at a center of the micromechanical gyroscope; and
    a sixth connection member, the sixth connection member connecting the drive members with the fourth anchor point.

14. The micromechanical gyroscope according to claim 1, wherein the drive members are configured parallelly with a number of two, which move in opposite directions along the first direction or the second direction.

15. The micromechanical gyroscope according to claim 2, wherein the drive members are configured parallelly with a number of two, which move in opposite directions along the first direction or the second direction.

16. The micromechanical gyroscope according to claim 3, wherein the drive members are configured parallelly with a number of two, which move in opposite directions along the first direction or the second direction.

17. The micromechanical gyroscope according to claim 4, wherein the drive members are configured parallelly with a number of two, which move in opposite directions along the first direction or the second direction.

18. The micromechanical gyroscope according to claim 1, wherein the plurality of drive members are distributed along a circumference of the micromechanical gyroscope, and the plurality of drive members all reciprocate along a tangential direction of the circumference, or all reciprocate in a radial direction of the circumference.

19. The micromechanical gyroscope according to claim 2, wherein the plurality of the drive members are distributed along a circumference of the micromechanical gyroscope, and the plurality of drive members all reciprocate along a tangential direction of the circumference, or all reciprocate in a radial direction of the circumference.

20. An electronic device, wherein the electronic device comprises:
   a main body; and
   a micromechanical gyroscope, the micromechanical gyroscope being mounted on the body, wherein the micromechanical gyroscope is the micromechanical gyroscope according to claim 1.

* * * * *